Jan. 12, 1926.  1,569,764
W. D. LOCKWOOD
APPARATUS FOR LAYING PIPE
Filed Feb. 14, 1923  2 Sheets-Sheet 1
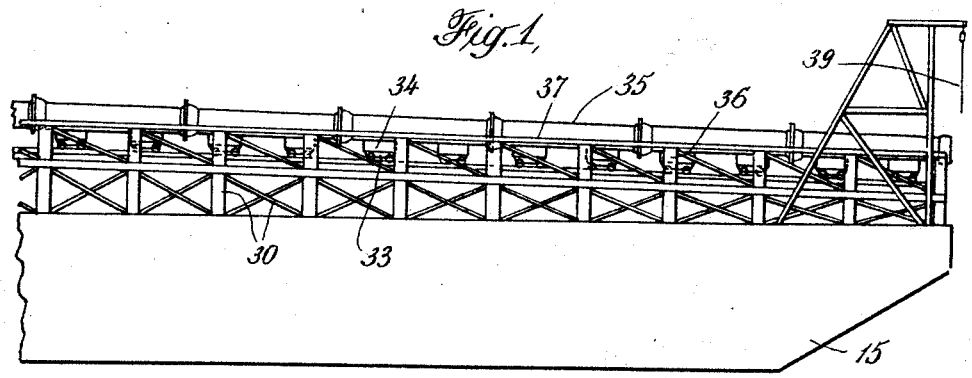
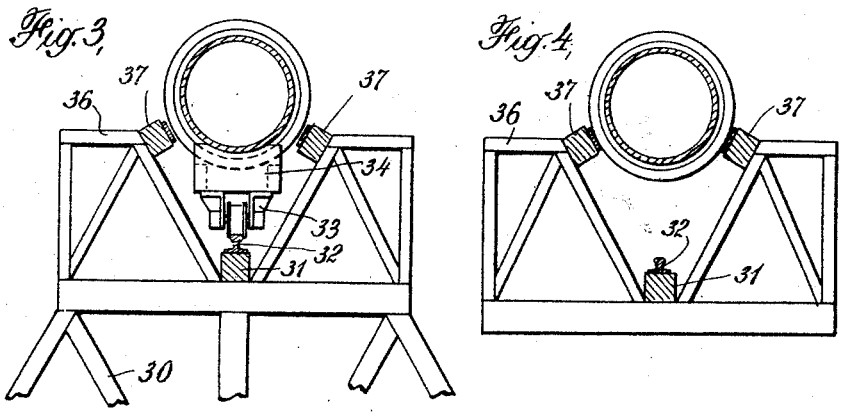
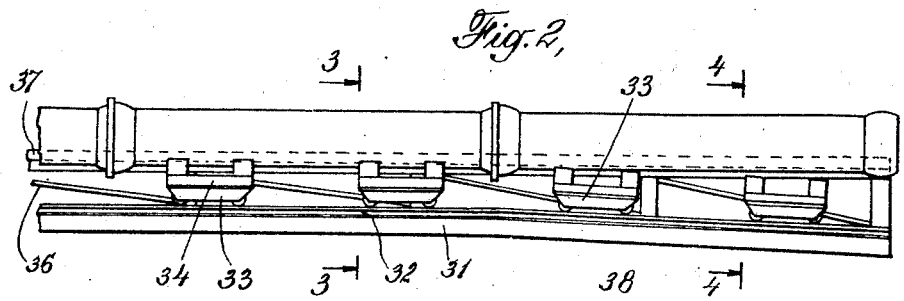
INVENTOR
Willard D. Lockwood
BY
E. W. Marshall
ATTORNEYS Jan. 12, 1926.  1,569,764
W. D. LOCKWOOD
APPARATUS FOR LAYING PIPE
Filed Feb. 14, 1923   2 Sheets-Sheet 2
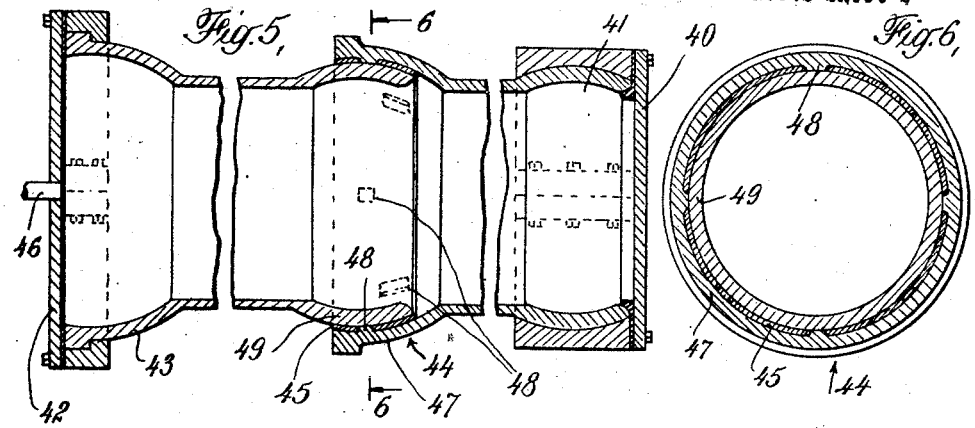
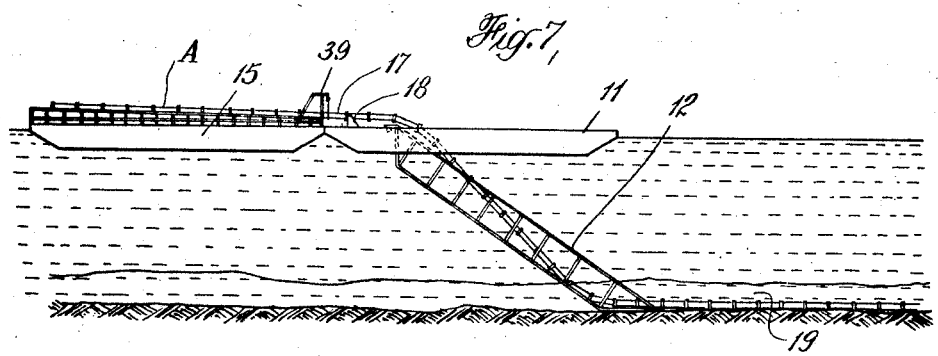
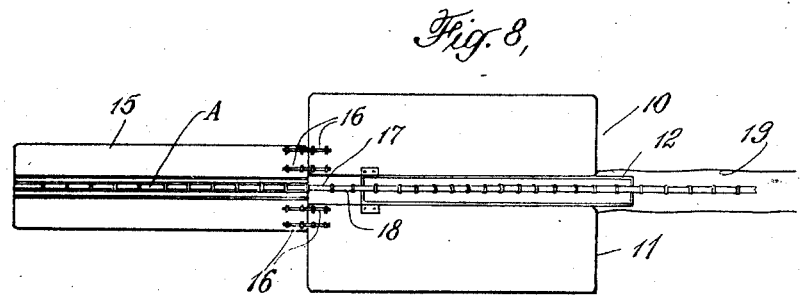
INVENTOR
Willard D. Lockwood
BY
E. W. Marshall
ATTORNEYS Patented Jan. 12, 1926.

1,569,764

UNITED STATES PATENT OFFICE.

WILLARD D. LOCKWOOD, OF PHILADELPHIA, PENNSYLVANIA, ASSIGNOR TO FREDERICK SNARE CORPORATION, OF NEW YORK, N. Y., A CORPORATION OF NEW YORK.

APPARATUS FOR LAYING PIPE.

Application filed February 14, 1923. Serial No. 618,931.

*To all whom it may concern:*

Be it known that I, WILLARD D. LOCKWOOD, a citizen of the United States, and a resident of Philadelphia, county of Philadelphia, and State of Pennsylvania, have invented certain new and useful Improvements in Apparatus for Laying Pipe, of which the following is a specification.

This invention relates to a method and an apparatus for assembling and laying submarine pipe lines.

Submarine pipe lines are generally laid in the following manner. Two scows are placed side by side in the channel, river or body of water where the pipe is to be laid and a cradle is supported between them. The pipe is then joined section by section and each joint is tested for tightness. As the sections are added the line of pipe is lowered step by step into the channel. This method is obviously slow and consumes much time and when the pipe line is being laid under navigable water much interference and interruption of traffic results. It is highly desirable therefore that the time consumption be cut down to a minimum.

This invention has for its salient object therefore to expedite the laying of submarine pipe.

Another object of the invention is to provide a method of laying submarine pipes so worked out that the obstruction of the channel in which the line is being laid will be reduced to a minimum.

Another object of the invention is to provide apparatus for facilitating and expediting the laying of submarine pipe lines.

Further objects of the invention will appear from the following description taken in connection with the drawings which form a part of this application and in which, Fig. 1 is an elevational view of a portion of a scow having thereon apparatus for assembling, joining and testing units of pipe sections.

Fig. 2 is an elevational view on an enlarged scale of a portion of the pipe supporting means shown in Fig. 1.

Fig. 3 is a transverse sectional elevation further enlarged taken substantially on line 3—3 of Fig. 2.

Fig. 4 is a transverse sectional elevation taken substantially on line 4—4 of Fig. 2.

Fig. 5 illustrates one form of apparatus and method which may be employed for testing the pipe joints between adjacent sections.

Fig. 6 is a transverse sectional elevation taken substantially on line 6—6 of Fig. 5.

Fig. 7 is an elevational view illustrating the method of laying the pipe and of joining units of pipe and Fig. 8 is a top plan view of the construction shown in Fig. 7.

The invention briefly described consists in assembling, coupling and testing the pipe in units of a plurality of sections and subsequently joining said units at the location where the pipe is being laid.

Referring first to Figs. 7 and 8 a method of laying the pipe line will be outlined. This method consists in utilizing a pair of scows 10 and 11 positioned side by side and having pivotally supported therebetween a cradle 12. As stated at the outset of the specification it is now a common practice to form a pipe line section by section and to test the joints between the sections successively as they are made. These joints are all made at the location in which the pipe is being laid and necessarily consume a considerable amount of time.

This invention, however, contemplates joining the sections in units, testing the units and transporting them to the laying apparatus and connecting them to the sections already joined. In the showing in Fig. 7 it is assumed that the sections in the cradle and disposed in the channel at the bottom of the river bed have already been tested.

After this has been done another scow 15 constructed in the manner hereinafter set forth is brought up and secured as shown at 16 to the scows 10 and 11.

The scow 15 carries a unit A of pipe sections which have previously been joined together and tested. The end section 17 of the unit A is positioned in the manner hereinafter described end to end with the end section 18 supported by the scows 10 and 11. A joint is then made between these sections 17 and 18 and the joint is tested by any suitable means as by compressed air to insure its tightness.

After this joint has been made the scow 15 is disconnected from the scows 10 and 11 and is withdrawn and the pipe line is paid out or laid along the channel 19 of the river bed. The weight of this line is sufficient to push the scows 10 and 11 with their cradle 12 along the channel.

The particular construction of supporting structure on the scow 15 will now be described. This scow has mounted thereon supporting structure comprising frame members 30 in which is mounted a longitudinal rail 31 having secured thereto a track 32. Upon this track are mounted trucks 33 having supporting cradles 34 adapted to engage and support the pipe sections 35 of the unit A.

The supporting structure also has mounted thereon a superstructure 36 having secured thereto a pair of guide rails 37 positioned adjacent the pipe sections.

The front end of the track 32 and rail 31 is inclined downwardly as shown at 38 in Fig. 2 and when the trucks reach this inclined portion of the track they roll downwardly out of engagement with the pipe section beneath which they are positioned. This pipe section will then be lowered into engagement with the guide rails 37 as shown in Fig. 4.

When the scow 15 with the unit A has been bolted or secured to the scows 10 and 11 the unit of pipe sections is moved longitudinally on the track 32 until the end section 17 is positioned adjacent the end section 18 of the pipe supported on the scows 10 and 11. The end section 17 is then lifted by means of a block and tackle 39 supported at the front end of the scow 15 until the section 17 is positioned in alinement with the section 18. The unit A is then moved to a position in which the ends of the sections 17 and 18 properly align for joining and the joint between the ends is calked in any suitable manner.

Figs. 5 and 6 illustrate one method fo testing the joint or joints between the pipe sections. A plate 40 is secured over the end 41 of one of the pipe sections and a plate 42 is secured over the end 43 of another pipe section. The joint 44 has been calked as shown at 45 and the compressed air is admitted as through a conduit 46 secured to the plate 42. Upon the admission of the air pressure the operator can determine whether the joint is tight.

In the particular joint illustrated the end 47 of one of the pipe sections has formed therein a plurality of lugs 48 disposed in staggered relation for properly positioning the end 49 of the adjacent section.

It will be evident that when the foregoing method of laying pipe lines was employed the units A may be assembled, joined and tested at the shore or in any desired location away from the traffic and that these units can be transported to the laying apparatus when needed and joined unit by unit to the line already laid or supported by the cradle and scows 10 and 11. Because of the fact that the joints in the units have all been tested it is only necessary to test at the laying apparatus the joints made between the sections 17 and 18. This obviously will require little time and therefore the actual laying of the pipe line will be greatly expedited and the obstruction to traffic will be reduced to a minimum.

Although I have particularly shown and described one method and a single set of apparatus for carrying out the method I do not intend to be limited to the specific details mentioned and it should be understood that the invention may be modified without departing from the spirit or scope of the appended claim.

What I claim is;

Apparatus for assembling, joining and testing units of pipe sections comprising a scow, a supporting structure mounted thereon, a track carried by said structure, trucks on said track having supports for the pipe sections and guide rails on said supporting structure, one end portion of the track being inclined dowwardly to permit the trucks to roll downwardly and cause the pipe sections to rest on said guide rails.

In witness whereof, I have hereunto set my hand this 8th day of February, 1923.

WILLARD D. LOCKWOOD,